US 12,133,614 B2
(45) Date of Patent: Nov. 5, 2024

(12) United States Patent
Hunt et al.

(54) BOWL ASSEMBLY (71) Applicant: KENWOOD LIMITED, Havant (GB)

(72) Inventors: Martin Hunt, Havant (GB); Mark Seidler, Havant (GB)

(73) Assignee: KENWOOD LIMITED, Havant (GB)

( * ) Notice: Subject to any disclaimer, the term of this patent is extended or adjusted under 35 U.S.C. 154(b) by 385 days.

(21) Appl. No.: 17/560,863

(22) Filed: Dec. 23, 2021

(65) Prior Publication Data

US 2022/0218154 A1 Jul. 14, 2022

Related U.S. Application Data (63) Continuation of application No. 16/079,618, filed as application No. PCT/GB2017/050496 on Feb. 24, 2017, now abandoned.

(30) Foreign Application Priority Data

Feb. 25, 2016 (GB) ...................................... 1603327

(51) Int. Cl.
*A47J 43/00* (2006.01)
*A47J 43/046* (2006.01)
*A47J 43/07* (2006.01)

(52) U.S. Cl.
CPC ......... *A47J 43/0727* (2013.01); *A47J 43/046* (2013.01)

(58) Field of Classification Search
CPC .................... A47J 43/046; A47J 43/0727
See application file for complete search history.

(56) References Cited

U.S. PATENT DOCUMENTS

| 2,750,162 | A | 6/1956 | Kircher |
| 5,749,285 | A | 5/1998 | Dorner et al. |
| 6,805,312 | B2 | 10/2004 | Capp |
| 7,371,004 | B1 * | 5/2008 | Branson, III ......... A47J 43/046 366/205 |
| 2006/0176770 | A1 | 8/2006 | Sands |
| 2014/0178545 | A1 | 6/2014 | Fach |
| 2014/0247686 | A1 * | 9/2014 | Arnett ................. A47J 43/0772 366/205 |
| 2015/0101491 | A1 * | 4/2015 | Lin ....................... A47J 27/004 99/348 |
| 2016/0324368 | A1 | 11/2016 | Seidler et al. |

FOREIGN PATENT DOCUMENTS

| CN | 201557993 U | 8/2010 |
| CN | 103565302 A | 2/2014 |

(Continued)

OTHER PUBLICATIONS

DE202013010484 to Klose machine translation (Year: 2014).*

(Continued)

*Primary Examiner* — Anshu Bhatia
(74) *Attorney, Agent, or Firm* — Harness, Dickey & Pierce, P.L.C.

(57) ABSTRACT

A bowl assembly 110 for a kitchen appliance 1 arranged to process ingredients contained within the bowl assembly 110, comprising: a bowl 112 having an aperture 115 in its base; a drivable tool mount 200 for a food processing tool arranged to fit within the aperture 115; and a blanking plug 300 arranged to fit within the aperture 115; wherein the drivable tool mount 200 and blanking plug 300 are interchangeable with one another.

16 Claims, 7 Drawing Sheets

(56) References Cited

FOREIGN PATENT DOCUMENTS

| | | |
|---|---|---|
| CN | 103976667 A | 8/2014 |
| CN | 204600260 U | 9/2015 |
| DE | 102010016667 A1 | 11/2011 |
| DE | 102012106636 A1 | 1/2014 |
| DE | 202013010484 U1 | 2/2014 |
| EP | 1731068 A1 | 12/2006 |
| EP | 2005869 A1 | 12/2008 |
| GB | 2007198 A | 5/1979 |
| KR | 10-20150115423 A | 10/2015 |
| WO | 2012075522 A1 | 6/2012 |
| WO | 2016120021 A1 | 8/2016 |

OTHER PUBLICATIONS

The Wayback Machine, https://web.archive.org/web/20151011095741/http://shop.vorwerk.fr/thermomix-fr/accessoires/couteau-seul-pour-thermomix-tm31.html.
International Search Report and Written Opinion issued in PCT/GB2017/050496, mailed May 9, 2017; ISA/EP.
GB Search Report of the Intellectual Property Office issued in Application No. GB1603327.6, dated Jun. 28, 2016.
Thermomix TM31 operating instructions, Vorwerk.
Companion operating instructions, Moulinex.
Extended European Search Report dated Jul. 11, 2018 for Application No. 18166878.1-1006 (6 pages).
Extended European Search Report dated Oct. 7, 2019 for Application No. 19192397.8-1006 (12 pages).
English Maching Translation of Opposition to European Patent No. 3264956, Mar. 2021 (14 pages).
Preliminary opinion for Application No. 17 708 571.9 dated Jul. 8, 2020 (3 pages).
PCT Opponent Submissions Machine translation for European Patent EP3264956 B1, dated Apr. 30, 2020 (8 pages).
Notice of Opposition machine translation for European patent No. 3264956 dated Mar. 6, 2019 (18 pages).
Preliminary Opinion for Application No. 17 708 571.9 dated Nov. 5, 2019 (4 pages).

* cited by examiner

BOWL ASSEMBLY

CROSS-REFERENCE TO RELATED APPLICATIONS

This application is a continuation application of U.S. Ser. No. 16/079,618 filed Aug. 24, 2018, which is a 371 U.S. National Stage of International Application No. PCT/GB2017/050496, filed Feb. 24, 2017 and published in English as WO 2017/144907 A1 on Aug. 31, 2017. This application claims the benefit of Great Britain Application No. GB1603327.6, filed on Feb. 25, 2016. The disclosure of each of the above-identified applications is incorporated herein by reference.

BACKGROUND OF THE INVENTION

This invention relates to a bowl assembly, for example for a kitchen appliance. In particular, this invention relates to a bowl assembly arranged to process contents such as food ingredients contained within the bowl assembly.

Technical Field

Kitchen appliances utilising a bowl containing a rotatable drive assembly to which a tool can be fitted are commonly used in the field of food preparation. Such kitchen appliances may also be arranged to heat the contents of the bowl.

Discussion

Certain cooking operations, such as slow cooking, rice cooking, and sous vide water bath cooking, do not require a rotating tool, and furthermore the presence of such a tool may impact the performance of these operations by obstructing movement of the ingredients and reducing the usable space in the bowl. A bowl containing a rotating drive assembly is therefore not well-suited to perform these and many other cooking operations.

According to an aspect of the invention there is provided a bowl assembly for an appliance such as a kitchen appliance arranged to process contents such as ingredients contained within the bowl assembly, comprising: a bowl having an aperture in its base; a tool mount for a food processing tool arranged to fit within the aperture; and a blanking plug arranged to fit within the aperture; wherein the tool mount and blanking plug are interchangeable with one another.

SUMMARY OF THE INVENTION

The tool mount and blanking plug may be each arranged to fill the aperture when fitted within the aperture, thereby sealing the aperture. Preferably, the tool mount and the blanking plug have substantially the same cross-sectional shape arranged to fit the aperture, whereby to seal it. Preferably, the cross-sectional shapes of both the tool mount and the blanking plug are arranged to correspond with the shape of the aperture such that they can fit the aperture, whereby to seal it. Preferably, by "fitting" the aperture the tool mount or blanking plug substantially fill the aperture.

The aperture may be a keyed aperture, and preferably has a non-circular shape. The tool mount and the blanking plug may each comprise a lip portion arranged to abut an edge of the aperture when fitted within the aperture. Preferably, the lip extends around substantially the entire circumference (or perimeter) of an upper (preferably a "cap") portion.

The bowl assembly may further comprise a locking arrangement, wherein in a first configuration the tool mount may be releasably engaged with the locking arrangement whereby to secure the tool mount to the bowl; and in a second configuration the blanking plug may be releasably engaged with the locking arrangement whereby to secure the blanking plug to the bowl.

The locking arrangement may be provided by a separate locking member. Preferably, the locking member is arranged to engage with the tool mount or blanking plug from an underside of the bowl. The locking member may be arranged to pivot relative to the tool mount or blanking cap between a "locked" first position whereby the tool mount or blanking plug arrangement is held secure by the locking member and an "unlocked" second position whereby the tool mount or blanking plug is released by the locking member. Preferably, in the second position, the locking member is arranged to inhibit correct mounting of the bowl onto a base unit of a kitchen appliance.

The locking member may comprise a collar arranged to receive part of the tool mount or blanking plug and a handle element extending outwardly from the collar. The locking member may be arranged so as to inhibit correct mounting of the bowl assembly onto a kitchen appliance when the locking member is in the second position. Optionally, the locking arrangement may be integral with the bowl. The locking arrangement may be configured to inhibit movement of the tool mount or blanking plug static relative to the bowl when fitted within the aperture of the bowl.

The tool mount is preferably a drivable tool mount, for transmitting drive to a tool.

According to another aspect of the invention there is provided a bowl for a bowl assembly as herein described, wherein the bowl has an aperture shaped to inhibit rotation of the tool mount or blanking plug when fitted within the aperture. The aperture may be a keyed aperture.

The bowl may be arranged to supply heat to food ingredients contained within the bowl. Optionally, the bowl may comprise a heating element arranged in a base of the bowl. The heating element may be arranged to receive power from a kitchen appliance to which the bowl assembly is mounted. The heating element is preferably a resistive heating element. The heating element is preferably substantially annular or ring-shaped. Optionally, the bowl may be arranged to heat contents via induction, for example wherein the inductive source is a kitchen appliance to which the bowl assembly is mounted. Preferably, the bowl may be arranged to receive power and/or heat from a kitchen appliance or a base unit thereof.

A bowl support may be provided for supporting the bowl in an upright position. A heating element may be provided within the bowl support, arranged so as to heat the bowl and/or its contents.

According to another aspect of the invention there is provided a blanking plug for a bowl assembly as herein described, comprising a body portion and a cap portion, optionally wherein the cap portion is arranged to provide a substantially continuous inner surface in the bowl when the body portion is fitted within an aperture in the bowl.

The cap portion may be arranged to extend across the aperture in the bowl. The cap portion may comprise a material having a thermal conductivity that is substantially similar to the material of the inner surface of the bowl so as to ensure continuity of heat transfer across the inner surface of the bowl.

The cap portion may arranged to overhang the body so as to provide a lip that can rest on an edge of the aperture when the blanking plug is fitted within the aperture. Preferably, the lip extends substantially the circumference of the cap portion. Preferably, the lip extends a sufficient amount to allow a sealing member to be positioned between the lip and the edge of the aperture. Optionally, the blanking plug may comprise an integral sealing member provided on an underside of the lip so as to be positioned between the lip and the edge of the aperture when the blanking plug is fitted within the aperture. The sealing member may be more deformable than the lip of the cap portion, whereby to effect a fluid-tight seal in use.

The body portion may define a dog-leg shape such that a part of the body portion further from the cap portion has a cross-section of a smaller diameter than a part of the body portion closer to the cap portion. The blanking plug may further comprise a plurality of bayonet tabs capable of being engaged by a locking arrangement whereby to secure the blanking plug to the bowl. Preferably, the plurality of tabs are provided on the part of the body portion that is further from the cap portion, preferably proximate a bottom surface of said further part of the body portion.

The upper part of the body portion may comprise a multi-faceted shape being arranged to correspond with a multi-faceted shape of the aperture and the part of the body portion that is further from the cap portion may comprise a substantially circular cross-sectional shape, preferably having a narrower diameter so as to be able to pass through the aperture readily.

The blanking plug may comprise a sensor arranged to measure a parameter of the bowl or food ingredients contained therein, preferably temperature. Preferably, the blanking plug further comprises a transmitter arranged to transmit data relating to a measured parameter.

According to another aspect of the invention there is provided a drivable tool mount for a bowl assembly as herein described. The tool mount may comprise a body portion; a cap portion; and a shaft arranged to extend longitudinally through the body portion such that it passes through the cap portion, wherein the cap portion is arranged to extend across an aperture in the bowl.

The drivable tool mount may be arranged to receive rotational drive from an underside of the bowl when fitted within the aperture, preferably from a rotatable drive outlet of the kitchen appliance. A bearing arrangement may be provided within the body portion for supporting the shaft.

The cap portion may comprise a material having a thermal conductivity that substantially similar to the material of the inner surface of the bowl so as to ensure continuity of heat transfer across the inner surface of the bowl. The cap portion may be arranged to overhang the body so as to provide a lip that can rest on an edge of the aperture when the drivable tool mount is fitted within the aperture. Preferably, the lip extends substantially the circumference of the cap portion. Preferably, the lip extends a sufficient amount to allow a sealing member to be positioned between the lip and the edge of the aperture. Alternatively, the driveable tool mount may further comprise an integral sealing member provided on an underside of the lip so as to be positioned between the lip and the edge of the aperture when the drivable tool mount is fitted within the aperture. The sealing member may be more deformable than the lip of the cap portion, whereby to effect a fluid-tight seal in use.

The body portion may define a dog-leg shape such that a part of the body portion further from the cap portion has a cross-section of a smaller diameter than a part of the body portion closer to the cap portion. The driveable tool mount may further comprise a plurality of bayonet tabs capable of being engaged by a locking arrangement whereby to secure the blanking plug to the bowl. Preferably, the plurality of tabs are provided on the part of the body portion further from the cap portion, preferably proximate a bottom surface of the further part of the body portion.

The upper part of the body portion may comprise a multi-faceted shape being arranged to correspond with a multi-faceted shape of the aperture and the part of the body portion further from the cap portion may comprise a substantially circular cross-sectional shape.

The driveable tool mount may comprise a sensor arranged to measure a parameter of the bowl or food ingredients contained therein, preferably temperature. Preferably, the driveable tool mount further comprises a transmitter arranged to transmit data relating to a measured parameter.

According to another aspect of the invention there is provided a kit of parts for constructing a bowl assembly, comprising: a bowl having an aperture as described above; a blanking plug arranged to fit within the aperture as described above; and a tool mount arranged to fit within the aperture as described above; wherein the tool mount and the blanking plug are interchangeable with one another.

The kit of parts may further comprise a locking member configured releasably to engage the tool mount or the blanking plug whereby to seal the aperture in the bowl. The kit of parts may further comprise at least one tool arranged to be mounted on the drivable tool mount.

According to an aspect of the invention, there is provided a method of providing multi-functionality to a bowl assembly for a kitchen appliance; comprising the steps of: providing a bowl assembly as described herein; removing one of said tool mount or blanking plug from the aperture; and fitting the other of said tool mount or blanking plug into the aperture.

The bowl assembly may further comprise a locking arrangement configured to engage the tool mount or blanking plug when fitted within the aperture whereby to secure it to the bowl.

According to another aspect of the invention there is provided a bowl assembly, comprising a bowl having an aperture, as described herein; a blanking plug arranged to fit within the aperture, as described herein; and/or a tool mount arranged to fit within the aperture, as described herein.

According to another aspect of the invention, there is provided a bowl assembly for a kitchen appliance arranged to process ingredients contained within the bowl assembly, comprising: a bowl having an aperture in its base; a rotational bearing (or "(drivable) tool mount") arranged to fit within the aperture for mounting a food processing tool; a blanking plug arranged to fit within the aperture; and a locking arrangement, wherein either in a first configuration, the rotational bearing is releasably engaged with the locking arrangement whereby to seal the aperture in the bowl; or in a second configuration, the blanking plug is releasably engaged with the locking arrangement whereby to seal the aperture in the bowl; wherein the rotational bearing and blanking plug are interchangeable with one another.

Preferably, the tool mount and blanking plug are each arranged to fill the aperture when fitted within the aperture, thereby sealing the aperture. Preferably, the tool mount and the blanking plug have substantially the same cross-sectional shape arranged to fill the aperture. Preferably, the cross-sectional shapes of both the tool mount and the blanking plug are arranged to correspond with the shape of the aperture such that they can fit within and fill the aperture.

The aperture may have a shape arranged to prevent rotation of the rotational bearing ((drivable) tool mount) or blanking plug when fitted therein. The aperture may be a keyed aperture, preferably wherein the rotational bearing (or (drivable) tool mount) and blanking plug are correspondingly shaped.

The locking arrangement may be integral with the bowl. Alternatively, the locking arrangement may be provided by a separate locking member. The locking member may be arranged to engage with the rotational bearing (or tool mount) or blanking plug from an underside of the bowl. The locking member may be arranged to pivot relative to the rotational bearing (or tool mount) or blanking cap between a "locked" first position whereby the rotational bearing (or tool mount) or blanking plug arrangement is held by the locking member and an "unlocked" second position whereby the rotational bearing (or tool mount) or blanking plug is released by the locking member. In the second position, the locking member may be arranged to inhibit correct mounting of the bowl onto a base unit of a kitchen appliance.

The locking member may further comprise a collar arranged to receive part of the rotational bearing (or tool mount) or blanking plug and a handle element extending outwardly from the collar. The locking member may be arranged so as to inhibit correct mounting of the bowl assembly onto a kitchen appliance when the locking member is in the second position.

As used herein, the terms 'tool mount' and 'driveable tool mount' preferably connote an assembly for mounting a rotatable tool, preferably a tool adapted for food processing, and preferably for transmitting rotational drive to that tool. The assembly may optionally have a rotatable shaft to which a tool may be mounted. Alternatively, the tool mount may be an integral part of a rotatable tool. The term may also be interchangeable with the terms 'rotational drive', 'drive assembly', 'bearing assembly', and "rotational bearing", for example.

As used herein, the term 'blanking plug' preferably connotes a component or an assembly operable to plug/seal an aperture. Preferably, the blanking plug has a featureless upper surface (or "cap").

The invention extends to methods and/or apparatus substantially as herein described and/or as illustrated with reference to the accompanying drawings.

The invention extends to any novel aspects or features described and/or illustrated herein. In addition, apparatus aspects may be applied to method aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

As used herein, means plus function features may be expressed alternatively in terms of their corresponding structure, such as a suitably programmed processor and associated memory, for example.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

Whilst the invention has been described in the field of domestic food processing and preparation machines, it can also be implemented in any field of use where efficient, effective and convenient preparation and/or processing of material is desired, either on an industrial scale and/or in small amounts. The field of use includes the preparation and/or processing of: chemicals; pharmaceuticals; paints; building materials; clothing materials; agricultural and/or veterinary feeds and/or treatments, including fertilisers, grain and other agricultural and/or veterinary products; oils; fuels; dyes; cosmetics; plastics; tars; finishes; waxes; varnishes; beverages; medical and/or biological research materials; solders; alloys; effluent; and/or other substances, and any reference to "food" herein may be replaced by such working mediums. It will be appreciated that the processing of food may include the processing and/or blending of liquid items, and may also include the processing of solid food or ice items into a liquid form.

The invention described here may be used in any kitchen appliance and/or as a stand-alone device. This includes any domestic food-processing and/or preparation machine, including both top-driven machines (e.g., stand-mixers) and bottom-driven machines (e.g., food processors). It may be implemented in heated and/or cooled machines. The invention may also be implemented in both hand-held (e.g., hand blenders) and table-top (e.g., blenders) machines. It may be used in a machine that is built-in to a work-top or work surface, or in a stand-alone device. The invention can also be provided as a stand-alone device, whether motor-driven or manually powered.

Aspects and embodiments of the invention are set out in the appended claims. These and other aspects and embodiments of the invention are also described herein.

BRIEF DESCRIPTION OF THE DRAWINGS

At least one embodiment of the invention will now be described, by way of example only, with reference to the accompanying drawings, in which:

FIG. 2b shows a cutaway side view of the bowl in FIG. 2a;

FIG. 4b shows a cutaway side view of the bowl assembly in FIG. 4a;

FIG. 5b shows a cutaway side view of the bowl assembly in FIG. 5a;

Figure 1:
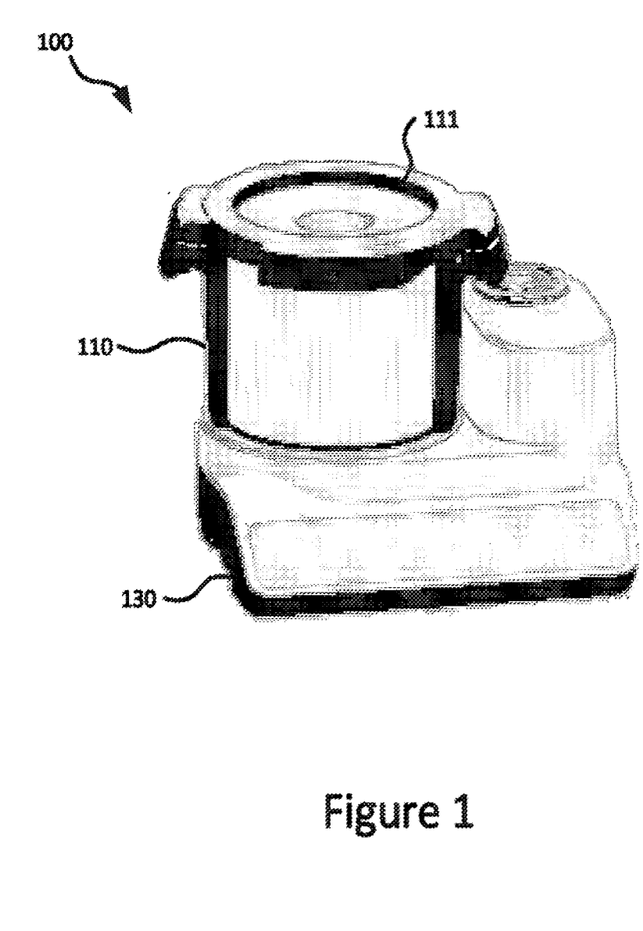
FIG. 1 shows a bowl assembly mounted on a base unit of a kitchen appliance.

FIG. 1 shows a bowl assembly 110 mounted on a base unit 130 of a kitchen appliance 100. The bowl assembly 110 comprises a bowl 112 and certain other assembly components, as will be described later on. The bowl assembly 110 may be provided with a lid 111 to prevent egress of ingredients during food processing. The bowl assembly 110 is wholly removable from the base unit 130, allowing for easy cleaning, tool changes, and loading or removal of food items for processing.

Figure 2A:
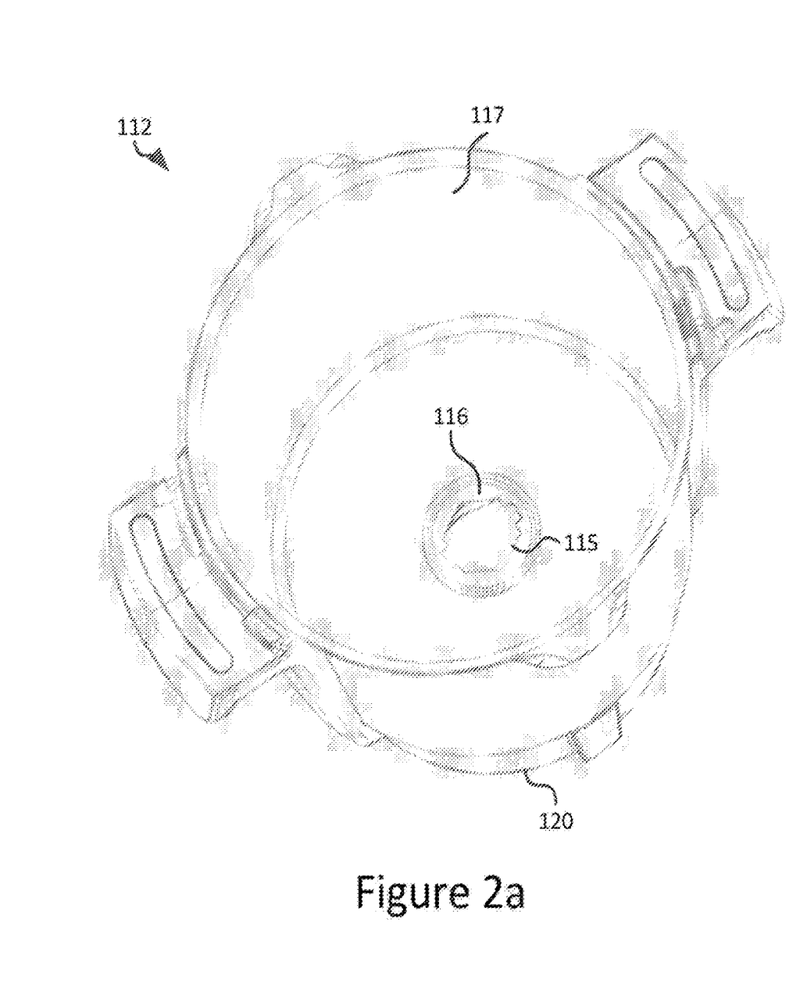
FIG. 2a shows a bowl of the bowl assembly.

FIG. 2a shows the bowl 112 of the bowl assembly 110. The bowl 112 comprises a bowl support 120 arranged on the bottom of the bowl 112. The bowl support 120 is configured to engage with the base unit 130 when the bowl assembly 110 is mounted on the base unit 130. The bowl 112 comprises a flat bottom surface 114 and a wall 117. The bowl 112 is cylindrically shaped, so as to promote the even processing of ingredients. The bottom surface 114 comprises an aperture 115 which may sealingly receive a component, as will be described later on. The aperture 115 preferably has a non-circular shape and may additionally be keyed, so as to prevent the rotation of any components being received into the aperture 115. The aperture 115 is preferably located in an indented section 116 of the bottom surface 114. The indented section 116 is preferably circular in shape, and is preferably located centrally on the bottom surface 114.

Figure 2B:
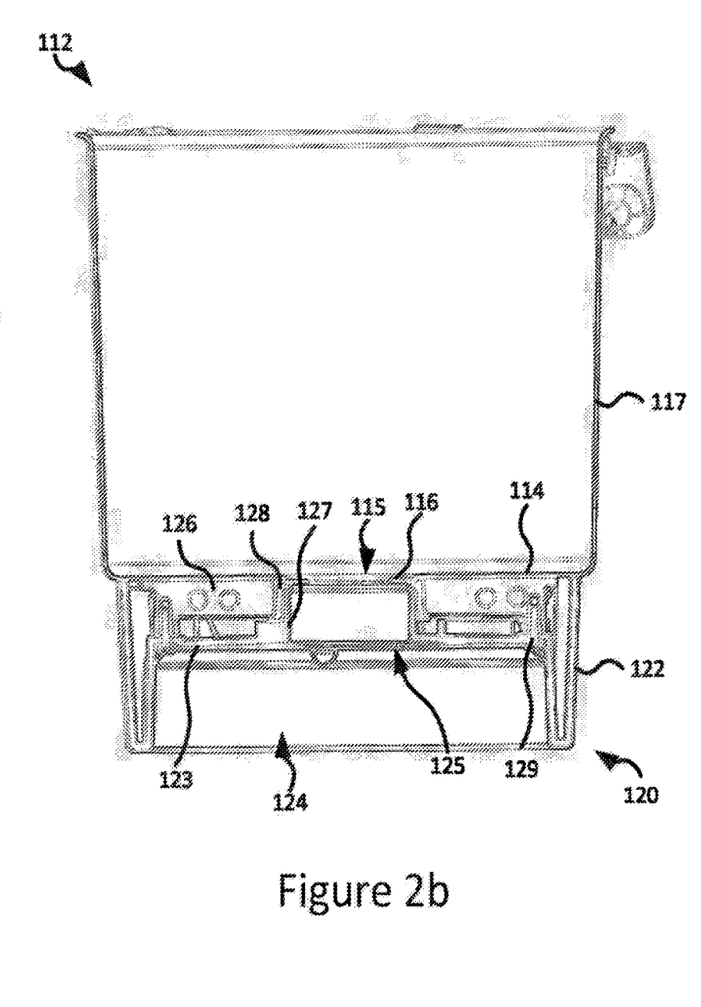

FIG. 2b shows a cutaway side view of the bowl 112. The bowl support 120 preferably comprises an outer wall 122 extending from the bottom surface 114, defining a chamber 124 beneath the bowl 112. A plate 123 having an aperture 125 is provided within the chamber 124. The aperture 125 is aligned with the aperture 115 provided in the bowl 112. The bowl support 120 further comprises an inner wall 127 extending from the edge of the aperture 125 towards the bottom surface 114. The aperture 125 is arranged to be of a larger diameter than the aperture 115, such that at least a portion of the indented section 116 extends beyond the inner wall 127 and is not supported by the bowl support 120.

The bowl support 120 holds a heating element 126 between the plate 123 and the bottom surface 114 of the bowl 112. The heating element 126 may be attached to the plate by fasteners 129, for example peg-shaped screws or fasteners that may extend into the heating element 126 to attach it to the plate 123. The heating element is electrically powered and, preferably, also controlled by the base unit 130, as discussed further on. The heating element 126 is preferably annular or ring-shaped so as to promote the even processing of ingredients, although other shapes may also be used, including star-shaped, square-shaped, or concentric rings, for example. Preferably, a resistive heating element 126 is used, being bonded to the bottom surface 114, although other heating elements may be used, including thick-film heaters, inductive heating either integral to the bowl or induced by an element in the base unit 130, and other heating means. The heating element 126 may comprise steel tubes containing resistive elements over-cast with aluminium. A sealing element 128 is preferably provided between the heating element 126, the inner wall 127, the plate 123, and the bottom surface 114, so as to prevent any fluid from contacting the heating element 128 and to locate the bowl support 120 relative to the heating element 126. The sealing element 128 preferably comprises a heat resistant and relatively heat conductive material, for example, a heat resistant polymer such as silicone.

Figure 3:
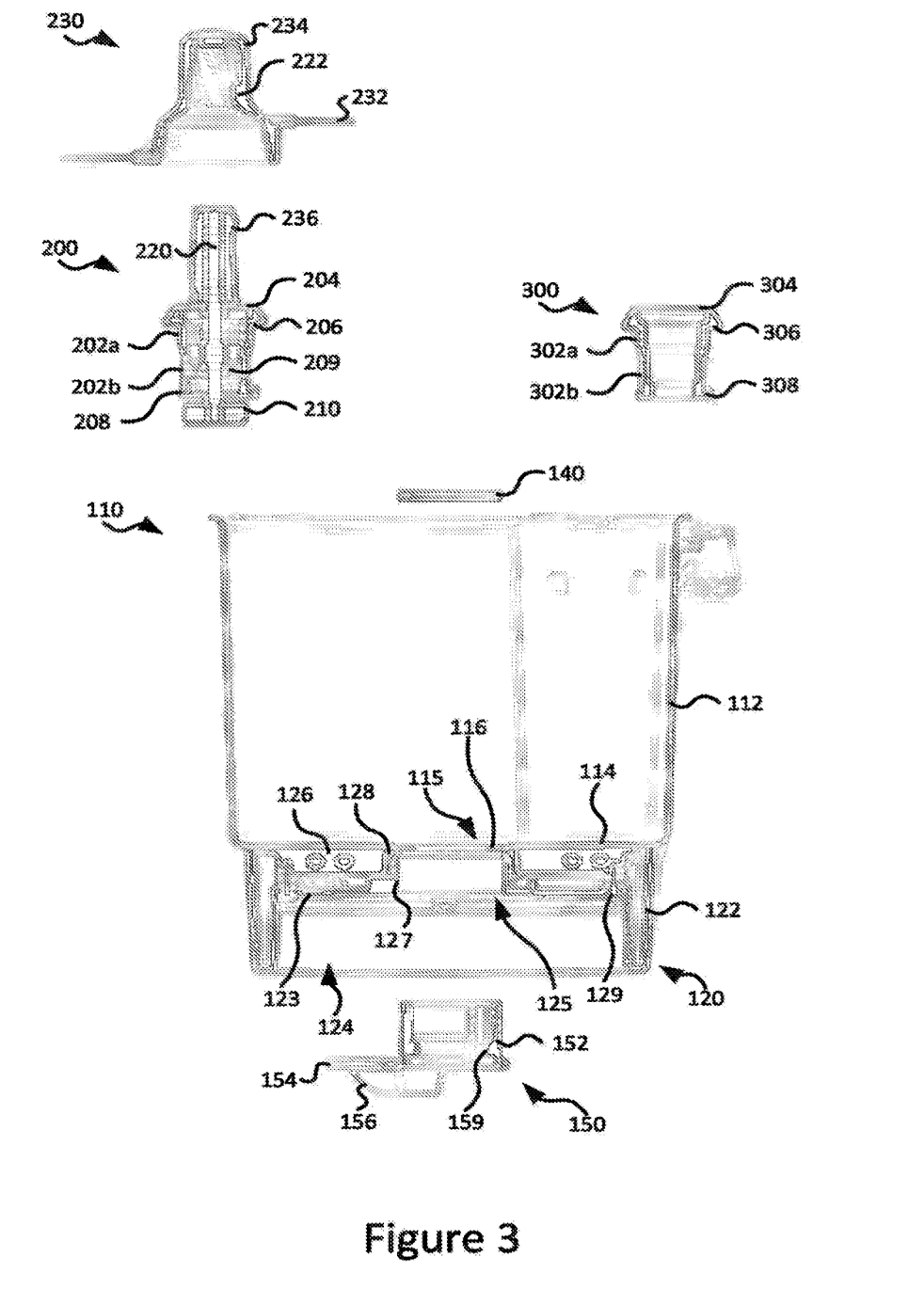
FIG. 3 shows a cutaway view of bowl assembly components.

FIG. 3 shows a cutaway view of bowl assembly 110 components. The components which can be engaged to the bowl 112 comprise a tool mount 200 which may be drivable, a processing tool 230, a blanking plug 300, a ring-shaped sealing member 140, and a locking arrangement 150. The sealing element 140 may be an "O"-ring, for example, comprising a compressible (relative to the material of the blanking plug 300) material such as rubber, or a polymer, for example, that can provide a seal under compression. The driveable tool mount 200 and the blanking plug 300 are arranged to be interchangeable components, each of which (together with the seal 140) can be received in the aperture 115 and be sealingly engaged by the locking arrangement 150. The locking arrangement 150 is shown as a separate component, but it can also be integral to the bowl and allowed to move to the extent that it can engage the driveable tool mount 200 or the blanking plug 300.

Figure 4A:
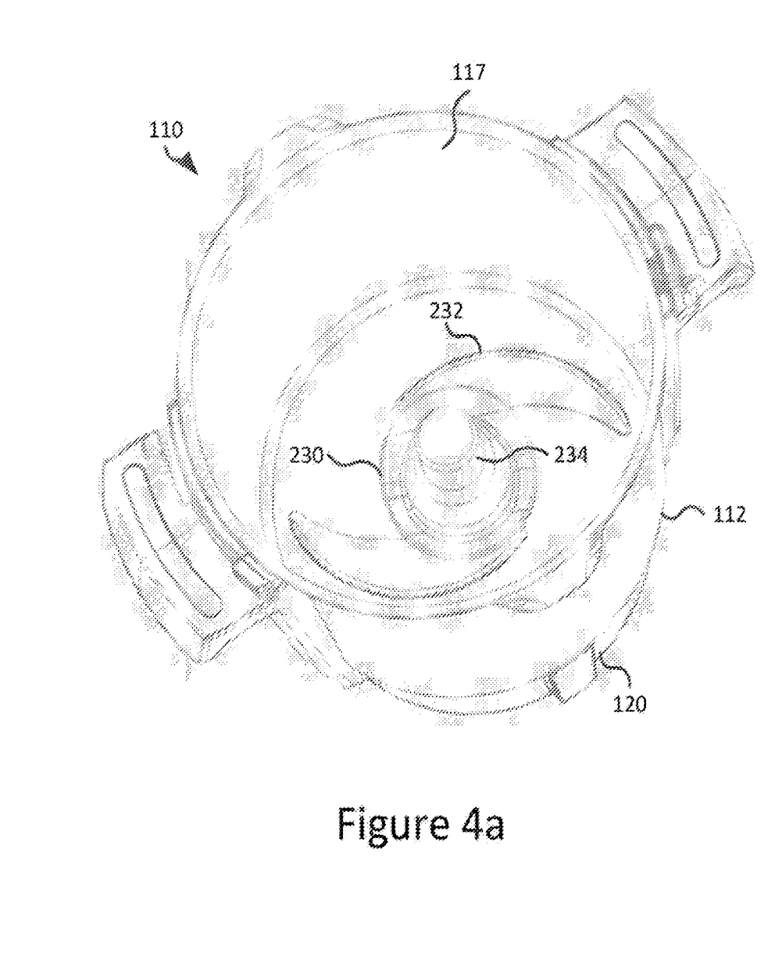
FIG. 4a shows a bowl assembly having a driveable tool mount and a tool fitted.
Figure 4B:
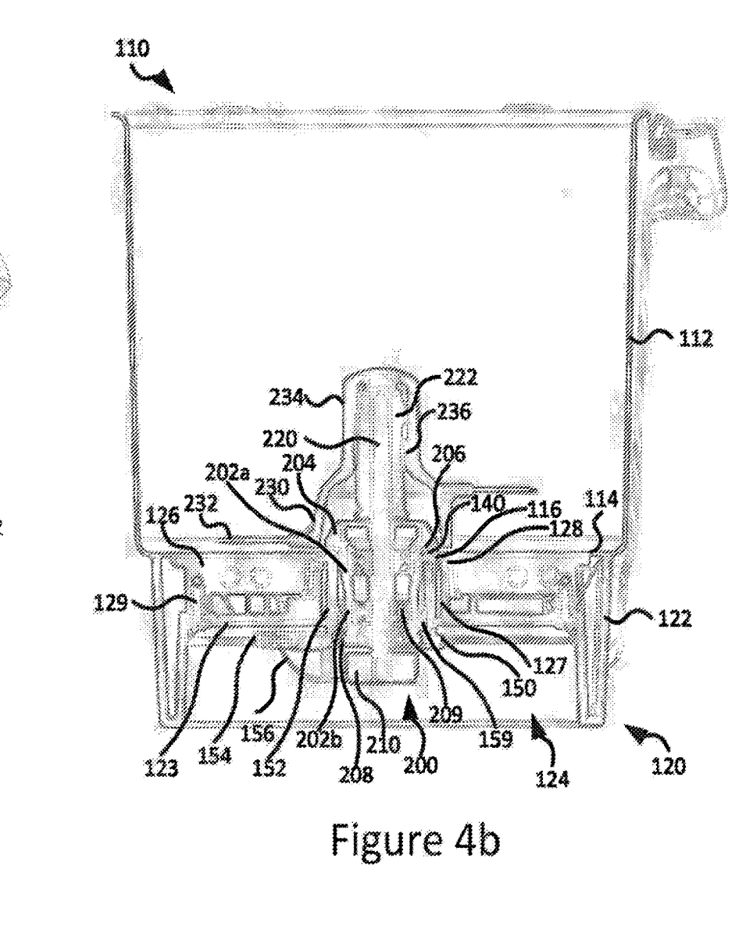

FIG. 4a shows the bowl assembly 110 having the driveable tool mount 200 and a tool 230 fitted. FIG. 4b shows a cutaway side view of the bowl assembly 110 having a driveable tool mount 200 and a tool 230 fitted. The driveable tool mount 200 comprises a cap 204 and a body 202 having a dog-leg shape such that upper and lower parts 202a, 202b are defined, with the lower part 202b being less wide (or having a smaller cross-section) than the upper part 202a. At least a part of the transverse cross-sectional shape of upper part 202a of the body 202 is arranged to have the same cross-section as the aperture 115, so that the driveable tool mount 200 may be securely received into the aperture 115. The cap 204 is arranged to be wider than the rest of the body 202, such that a flange 206 is defined which the ring-shaped seal 140 can be located against. The cap 204 is arranged to extend above the top of the body 204, such that it protrudes into the bowl 112. Preferably, the cap 204 extends into the bowl 112 no further than 10% of the height of the bowl 112 (preferably, less than roughly 20 mm in a typical cooking bowl). Alternatively, the cap 204 may be arranged to be flush with the bottom surface 114. The body 202 further comprises a plurality of tabs 208 for engaging with the locking arrangement 150, as will be described later on.

The driveable tool mount 200 is arranged to hold a rotatable shaft 220 to which a tool 230 is mountable. The shaft 220 extends longitudinally through the driveable tool mount 200 and out of apertures provided in the cap 204 and a bottom surface of the body 202. A plurality of bearings 209 are provided within the body to support the shaft 220 and allow it to freely rotate. The interior surfaces of the upper and lower parts of the body 202a, 202b are substantially parallel to the shaft, so as to support the bearings 209. The end of the shaft 220 adjacent the bottom surface of the driveable tool mount 200 is provided with features arranged to be engaged with a drive coupling, such as a gear 210.

The processing tool 230 is removably mountable to the distal end of the rotatable shaft 220 in respect of the gear 210. The processing tool 230 is preferably interchangeable with a plurality of other processing tools 230 being adapted for particular processing operations, such as cutting or stirring. A cutting tool 230 is shown in FIG. 4a. A processing tool 230 may comprise a plurality of members or blades 232 and an elongate central section 234 arranged to fit around the shaft 220. Preferably, the elongate central section 234 also fits over the shaft 220. A faceted section 222 may be provided on the shaft, being arranged to cooperate with a corresponding faceted section 236 provided on the inside of the central section 234 to allow the processing tool 230 to fit onto the shaft 220 using a twist fit or a snap fit. Other attachment means may alternatively be used, such as a screw fitting. Alternatively, the processing tool 230 may be permanently attached to the shaft 220, and the entire driveable tool mount 200 may be interchanged with other driveable tool mounts 200 having a different processing tool 230 in order to change the tool. The shaft 220 (and thereby the processing tool 230) is powered and controlled by the base unit 130.

Where the driveable tool mount 200 is engaged with the bowl assembly 110, the driveable tool mount 200 is received into the aperture 115 in the bowl 112 with the seal 140 being located against the flange 206. The locking arrangement 150 is used to compress the seal 140 between the flange 206 and the indented portion 116 of the bottom surface 114, sealing the aperture 115. When engaged, the end of the shaft 220 having the gear 210 extends through the locking arrangement 150 into the chamber 124, allowing the shaft 220 to be driven via the gear 210. When disengaged, the locking arrangement 150, seal 140, and the driveable tool mount 200 can be wholly removed from the bowl assembly 110, allowing for improved cleaning as well as allowing for interchangeable components to be used with the bowl assembly 110.

Figure 5A:
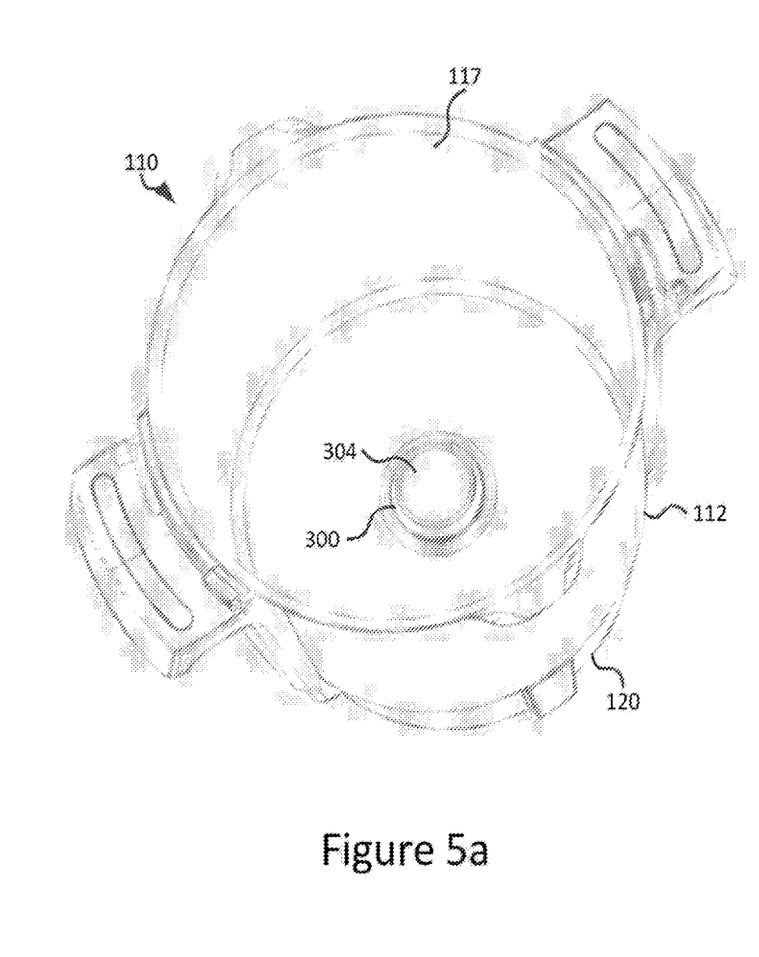
FIG. 5a shows a bowl assembly having a blanking plug fitted.
Figure 5B:
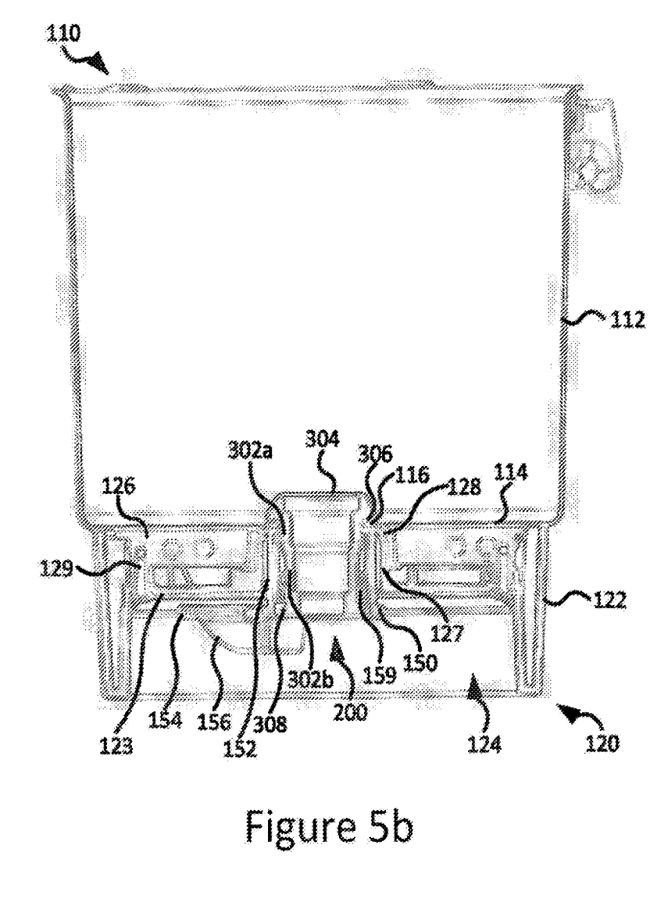

FIG. 5a shows the bowl assembly 110 having a blanking plug 300 fitted. FIG. 5b shows a cutaway side view of the bowl assembly 110 having a blanking plug 300 fitted. The blanking plug 300 comprises a cap 304 defining a flange 306 and a body 302 having a dog-leg shape such that upper and lower parts 302a, 302b are defined, with the lower part 302b being less wide (or having a smaller cross-section) than the upper part 302a. The body 302 is arranged to have the same dimensions as the body 202 of the driveable tool mount 200, so that the blanking plug 300 can be used interchangeably with the driveable tool mount 200. The body 302 of the blanking plug 300 differs from the body 202 of the driveable tool mount 200 in that it does not comprise apertures for a shaft. The cap 304 comprises a featureless top surface being arranged to remain static relative to the bowl 112.

The blanking plug 300 is engaged with the bowl assembly 110 as described with reference to the driveable tool mount 200, with the same locking arrangement 150 being used in the same way. Optionally, the same seal 140 may be used. The blanking plug 300 does not comprise any of the interior features of the driveable tool mount 200, such as the bearings 209, and so may be hollow.

Unlike the driveable tool mount 200, the blanking plug 300 does not hold a shaft 220, so the engagement of the blacking plug 300 with the bowl increases the space available in the bowl. The increased space in the bowl 112 where the blanking plug 300 is engaged allows the bowl 112 to be used with the heating element 126 for cooking operations such as slow cooking, sous vide water bath cooking, poaching, stewing, rice cooking, braising and pot roasting without the shaft 220 and/or tool 230 causing obstructions. This allows large ingredients to be cooked using the kitchen appliance 100, for example, a slow cooked joint of meat. Both the driveable tool mount 200 and the blanking plug 300 may seal the aperture 115, so the bowl 112 is safely useable where either component is engaged.

Figure 6A:
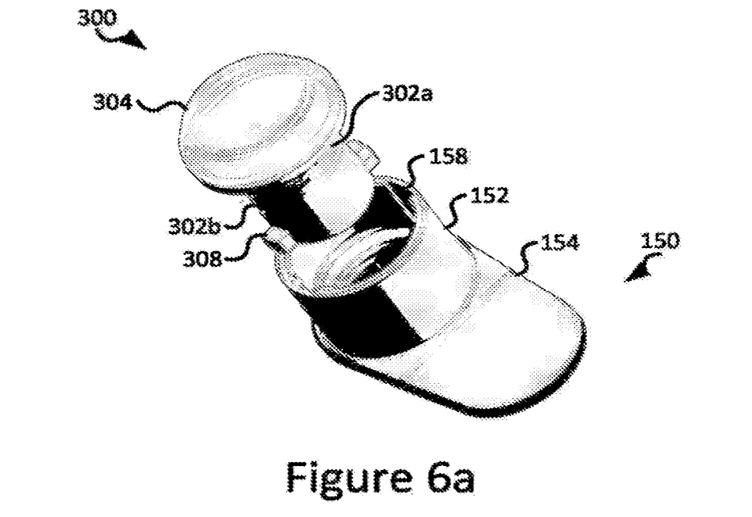
FIG. 6a shows an exploded perspective view of a blanking plug and locking arrangement.
Figure 6B:
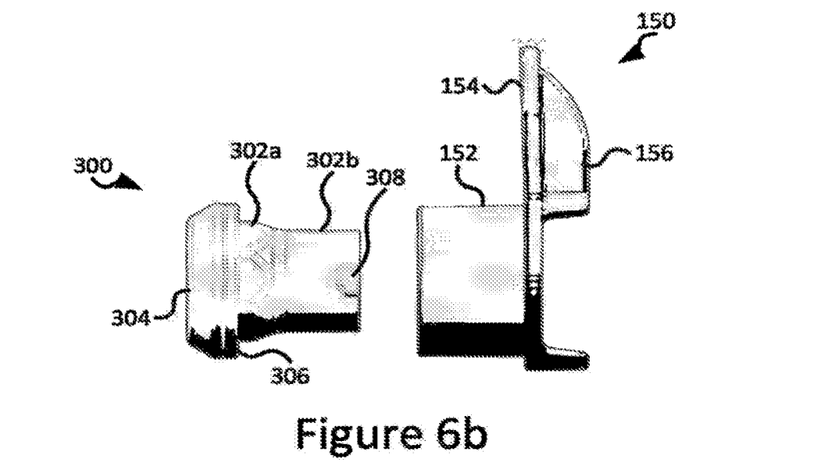
FIG. 6b shows an exploded side view of the blanking plug and the locking arrangement.

FIG. 6a shows an exploded perspective view of the blanking plug 300 and the locking arrangement 150. FIG. 6b shows an exploded side view of the blanking plug 300 and the locking arrangement 150. The locking arrangement 150 comprises a collar 152 and a handle 154. The collar 152 is cylindrical in shape and is open at both ends to allow components to protrude through the collar 152. The handle 154 preferably comprises a member being arranged to extend radially away from an end of the collar 152 and a finger grip 156 extending perpendicularly out of the member.

Figure 6C:
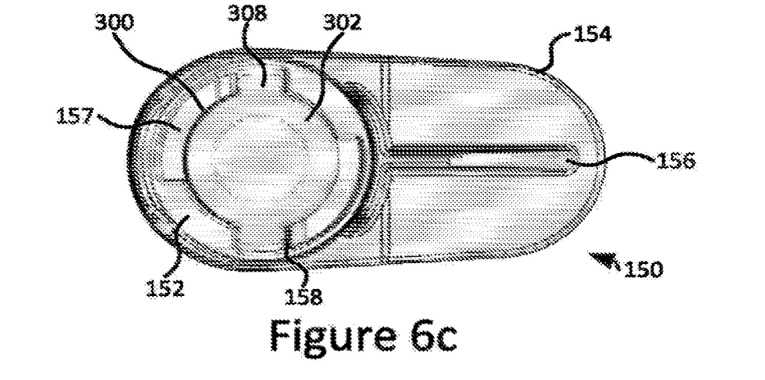
FIG. 6c shows an underside view of the blanking plug in a disengaged position within the locking arrangement.

FIG. 6c shows an underside view of the blanking plug 300 in a disengaged position within the locking arrangement 150. The locking arrangement 150 is arranged to engage with the driveable tool mount 200 or the blanking plug 300 via a bayonet fit. A plurality of tabs 208, 308 are provided on the driveable tool mount 200 and the blanking plug 300, the tabs 208, 308 being arranged to cooperate with corresponding bayonet features provided within the collar 152. The tabs 208, 308 are preferably provided on the lower part of the body 202b, 302b proximate the bottom surface of the driveable tool mount 200 or the blanking plug 300. The corresponding bayonet features may comprise inwardly protruding features 159, recesses 158 and/or sloped slots 157 provided in a wall of the collar 152. Where inwardly protruding features 159 are provided, the smaller cross-section of the lower part of the body 202b, 302b may allow the tabs 208, 308 to be engaged with the inwardly protruding feature 159, as FIGS. 4b and 5b show.

Preferably, the bayonet features are arranged such that the handle 154 is rotated 90 degrees or more to fully engage the driveable tool mount 200 or the blanking plug 300 and seal the aperture 115. The use of a bayonet fitting allows the locking arrangement 150 to be easily engaged and disengaged by a user using the handle 154.

Figure 7:
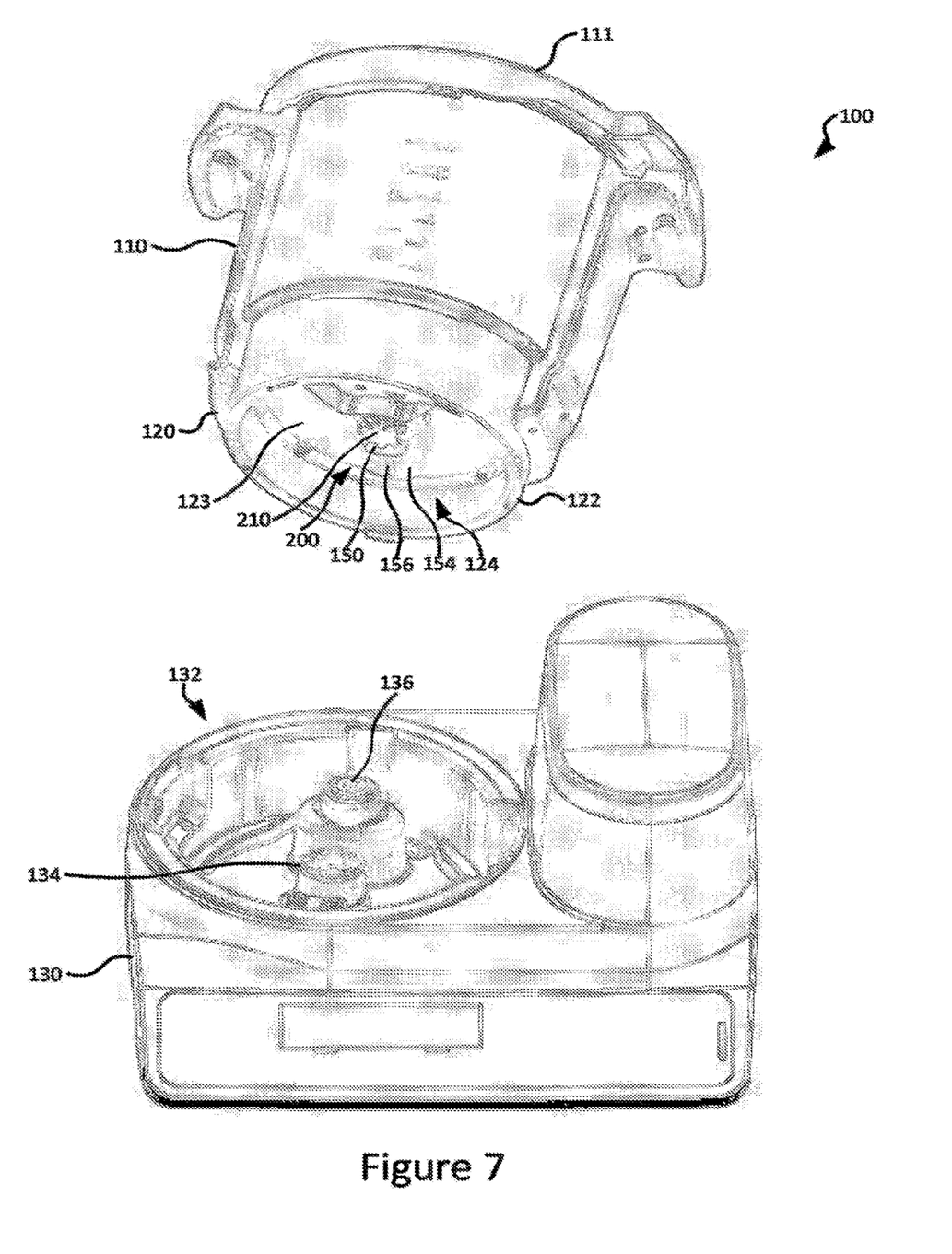
FIG. 7 shows a bowl assembly separated from a base unit of a kitchen appliance.

FIG. 7 shows the bowl assembly 110 separated from the base unit 130 of the kitchen appliance 100. The driveable tool mount 200 is shown fitted to the bowl assembly 110, with the locking arrangement 150 being shown in a disengaged position. The base unit 130 comprises a cavity 132 arranged to fit the bowl support 120. The cavity 132 comprises a drive coupling 134 and a probe 136, both of which extend upwardly from the base of the cavity 132 so as to protrude into the chamber 124 when the bowl assembly 110 is engaged with the base unit 130. The cavity 132 may comprise a drain (not shown) arranged to direct liquid entering the cavity 132 from above out of the cavity 132, with the aim of preventing or mitigating any damage caused by liquid leakage in the event that the bowl assembly 110 is used when the aperture 115 not sealed. The base unit 130 may also comprise an electronic processor having a user interface and an electronic data-store. The processor is arranged to control the heating element 126 and/or a motor in response to user inputs and according to stored control instructions. Alternatively, the base unit 130 may comprise a simple analogue control system or an integrated circuit using transistor logic in place of the processor.

When the driveable tool mount 200 is engaged with the bowl assembly 110 and the bowl assembly 110 is mounted to the base unit 130, the drive coupling 134 is arranged to engage with the gear 210 so as to supply drive to the shaft 220. When the blanking plug 300 is instead engaged with the bowl assembly 110 and the bowl assembly 110 is mounted to the base unit 130, the base of the blanking plug 300 is spaced away from the drive coupling 134. The drive coupling 134 therefore cannot interfere with the bowl assembly 110 when the blanking plug 300 is engaged with the bowl assembly 110.

The probe 136 is arranged so as to protrude through an aperture (not shown) provided in the plate 123 when the bowl assembly 110 is mounted to the base unit 130. The positions of the aperture and the probe 136 are arranged such that the handle 154 of the locking arrangement 150 covers the aperture where the locking arrangement 150 is not in a fully engaged position. The width of the handle 154 is preferably arranged such that the aperture is accessible only when the locking arrangement 150 is in a fully engaged position. The arrangement of the aperture for the probe, the probe 136, and the locking arrangement 150 prevents the bowl assembly 110 from being engaged with the base unit 130 where the locking arrangement 150 is not fully engaged. This thereby provides a safety interlock preventing the bowl assembly 110 being operated without being the aperture 115 being sealed.

The probe 136 may optionally comprise a temperature sensor such as a thermocouple or a thermistor, and may be arranged to protrude through the aperture in the plate 123 to approach or contact the heating element 126.

The bowl 112 preferably comprises a metal to improve heat transfer to ingredients during cooking. The bowl support 120 preferably comprises a relatively non-heat-conductive material such as plastic. At least the caps 204, 304 of the driveable tool mount 200 or the blanking plug 300 are preferably made out of a material with a thermal conductivity comparable to the material that the bowl 112 is made out of, so as to avoid a 'cold spot' being located at the cap 204, 304 during cooking. The material is preferably also food-safe, durable, and corrosion-resistant. Examples of such materials include metals such as stainless steel.

Preferably, a heat conductive path is provided from the heating element 126 to the cap 204, 304 to further mitigate the 'cold spot' effects of the cap 204, 304. The heat conductive path is created by providing that at least some of the bowl 112, the body 202, 302, or the collar 152 comprise heat conductive materials, preferably metals in metal-to-metal contact. The handle 154 preferably comprises or is coated with an insulating material such as plastic, to facilitate a user manipulating the handle 154. The seal 140 preferably comprises a flexible, heat-resistant and relatively conductive material, such as rubber.

Although the seal 140 has been described as a separate component, it will be appreciated that one or more sealing components 140 that are integral with the flanges 206, 306 or the indented section 116 could instead be used.

Instead of the recesses 158 and slots 157, the locking arrangement 150 may alternatively be provided with a plurality of inwardly protruding tabs to provide a bayonet fitting with the tabs 208, 308. It will be appreciated that a variety of methods of fitting the locking arrangement 150 and the driveable tool mount 200 or the blanking plug 300 together while compressing the seal 140 could be alternatively used, such as the driveable tool mount 200 or the blanking plug 300 being engaged via a sliding or rotational fit, such as a screw fit. It will also be appreciated that an alternative locking arrangement to the described collar 152 and handle 154 may be used to removably retain the driveable tool mount 200 or the blanking plug 300 in the aperture 115, such as a locking lever.

The driveable tool mount 200 and the blanking plug 300 may comprise a body 202, 302 being made of a single component or alternatively multiple components. Where multiple components of the body 202, 302 are provided, a lower part 202b, 302b may be able to rotate independently from an upper part 202a 302a, so as to allow the aperture 115 to be locked by means of a bayonet fitting without frictional resistance between the flange 206, 306 and the seal 140 or the seal 140 and the indented section 116.

The blanking plug 300 may comprise internal components, such as a sensor, such as a temperature sensor being arranged to measure temperature data related to the contents of the bowl, and a transmitter arranged to transmit said data.

Optionally, the blanking plug 300 may not be provided with a bottom surface, unlike the driveable tool mount 200. Where the blanking plug 300 has no bottom surface, it may be provided with a plurality of graduation marks to allow the blanking plug 300 to be used as a measuring cup.

The bowl assembly 100 may be optionally provided with a further safety interlock mechanism, such as an electronic interlock mechanism. Where a further interlock mechanism is provided, the driveable tool mount 200 and/or the blanking plug 300 may be provided with tags being detectable by one or more sensors provided in the bowl assembly 110 or the base unit 130. The further interlock mechanism may be configured to de-energise the drive coupling 134 where the blanking plug 300 is engaged with the bowl assembly 110.

The further interlock mechanism may also detect a tag provided in the lid 111, and may be configured to allow activation of the heating element 126 without the presence of the lid 111 where the blanking plug 300 is engaged with the bowl assembly 100, but not allow the same where the driveable tool mount 200 is engaged with the bowl assembly, because of the increased risk of splashing. The tags may communicate with the sensors using RFID, NFC, or magnetically-actuated reed switches, for example. Alternatively, the further interlock mechanism may be a physical mechanism comprising a push-rod and micro-switch arrangement, for example. In a further alternative, the further interlock mechanism may be used instead of the interlock mechanism provided by the arrangement of the locking arrangement 150, probe 136, and aperture for the probe.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A bowl assembly for an appliance arranged to process contents of the bowl assembly, comprising:
   a bowl having a bottom surface and a non-circular aperture in the bottom surface;
   a tool mount for a processing tool, the tool mount being arranged to fit within the aperture in the bottom surface of the bowl in a first configuration of the bowl assembly; and
   a blanking plug arranged to fit within the aperture in the bottom surface of the bowl in a second configuration of the bowl assembly, the blanking plug having a body portion and a cap portion which is arranged to extend across the aperture in the bottom surface of the bowl; and
   a locking arrangement, wherein in a first configuration the tool mount is releasably engaged with the locking arrangement whereby to secure the tool mount to the bowl; and in a second configuration the blanking plug is releasably engaged with the locking arrangement whereby to secure the blanking plug to the bowl, the locking arrangement having a locked condition whereby the tool mount or blanking plug is held secure in the aperture, and an unlocked condition whereby the tool mount or blanking plug is released from sealing engagement with the aperture;
   wherein the cross-sectional shapes of both the tool mount and blanking plug are arranged to correspond with said non-circular shape of the aperture so as to inhibit rotation when fitted within the aperture;
   wherein the tool mount and the blanking plug are interchangeable with one another; and
   wherein the bowl assembly is mountable with the appliance for processing in both the first and second configurations.

2. The bowl assembly of claim 1, wherein the tool mount and blanking plug are each arranged to fit within the aperture, whereby to seal it, and/or wherein the tool mount and the blanking plug each comprise a lip portion arranged to abut an edge of the aperture when fitted within the aperture.

3. The bowl assembly of claim 1, wherein the aperture is a keyed aperture, and/or wherein the tool mount and the blanking plug have substantially the same cross-sectional shape arranged to fit the aperture, and/or wherein the cross-sectional shapes of both the tool mount and the blacking plug are arranged to correspond with the shape of the aperture such that they can fit and fill the aperture.

4. The bowl assembly of claim 3, wherein the locking arrangement is provided by a separate locking member.

5. The bowl assembly of claim 4, wherein the locking arrangement comprises a locking member arranged to pivot relative to the drivable tool mount or blanking cap between the "locked" position and the "unlocked" position, wherein the locking arrangement is configured to inhibit movement of the tool mount or blanking plug relative to the bowl when fitted within the aperture of the bowl.

6. The bowl assembly of claim 5, wherein, in the second position, the locking member is arranged to inhibit correct mounting of the bowl onto a base unit of the appliance, and/or wherein the locking member comprises a collar arranged to receive part of the tool mount or blanking plug and a handle element extending outwardly from the collar, and/or wherein the locking member is arranged to engage with the tool mount or blanking plug from an underside of the bowl, and/or wherein the locking arrangement is integral with the bowl.

7. The bowl assembly of claim 1, wherein the bowl has a bowl support arranged on the bottom of the bowl for supporting the bowl in an upright position, and/or the appliance is a kitchen appliance, and the processing tool is a food processing tool.

8. The bowl assembly of claim 1, wherein the bowl is arranged to supply heat to contents of the bowl, preferably wherein the bowl comprises a heating element arranged in a base of the bowl and/or wherein the bowl is arranged to heat contents via induction, and/or wherein the bowl is arranged to receive power and/or heat from a separate base unit.

9. The bowl assembly according to claim 1, wherein the cap portion is arranged to provide a substantially continuous inner surface in the bowl when the body portion is lifted within an aperture in the bowl, and/or wherein the cap portion has an upper surface which is substantially flat or featureless whereby to increase the space available in the bowl, and/or does not comprise a finger-grip.

10. The bowl assembly of claim 9, wherein the cap portion comprises a material having a thermal conductivity that is comparable to the material of the inner surface of the bowl, and/or wherein one or both of the bowl and the cap portion comprise a metal such as stainless steel.

11. The bowl assembly of claim 9, wherein the cap portion is arranged to overhang the body so as to provide a lip that can rest on an edge of the aperture when the blanking plug is fitted within the aperture, optionally wherein the lip has a chamfered edge adjoining the upper surface, and wherein the lip extends a sufficient amount to allow a sealing member to be positioned between the lip and the edge of the aperture, and optionally further comprising an integral sealing member provided on an underside of the lip so as to be positioned between the lip and the edge of the aperture when the blanking plug is fitted within the aperture, optionally wherein the sealing member is more deformable than the lip of the cap portion, whereby to effect a fluid-tight seal in use.

12. The bowl assembly of claim 9, wherein a cap portion of the blanking plug extends into the bowl no further than at least one of 10% of the height of the bowl and 20 mm, and/or wherein the bowl assembly comprises a single ring-shaped sealing member for use with the blanking plug.

13. The bowl assembly of claim 12, further comprising a plurality of bayonet tabs capable of being engaged by a locking arrangement whereby to secure the tool mount or blanking plug to the bowl, optionally wherein the plurality of tabs are provided on the part of the body portion that is further from the cap portion, and wherein the plurality of tabs are provided proximate a bottom surface of the part of the body portion further from the cap portion.

14. The bowl assembly of claim 1, wherein the tool mount and blanking plug each comprise a body portion and a cap portion, optionally wherein the part of the body portion closer to the cap portion comprises a multi-faceted shape being arranged to correspond with a multi-faceted shape of the aperture, and optionally wherein the body portion defines a dog-leg shape such that a part of the body portion further from the cap portion has a cross-section of a smaller diameter than a part of the body portion closer to the cap portion.

15. The bowl assembly of claim 1, wherein the blanking plug and/or the tool mount comprises a sensor arranged to measure a parameter of the bowl or contents of the bowl, and optionally wherein the blanking plug and/or the tool mount further comprises a transmitter arranged to transmit data relating to a measured parameter.

16. The bowl assembly of claim 1, wherein the tool mount is drivable for driving the tool, optionally wherein the bowl assembly comprises at least one tool arranged to be mounted on the tool mount, optionally wherein the mount comprises a body portion; a cap portion; and a shaft arranged to extend longitudinally through the body portion such that it passes through the cap portion, optionally wherein the cap portion is arranged to extend across an aperture in the bowl, and optionally wherein a bearing arrangement is provided within the body portion for supporting the shaft, and/or wherein the tool mount is arranged to receive rotational drive from an underside of the bowl when fitted within the aperture, preferably from a rotatable drive outlet of the kitchen appliance.

* * * * *